United States Patent
Kirchhübel et al.

(10) Patent No.: US 8,475,547 B2
(45) Date of Patent: Jul. 2, 2013

(54) ENTRAINED-FLOW GASIFIER WITH COOLING SCREEN AND SLIDING SEAL

(75) Inventors: Volker Kirchhübel, Freiberg (DE); Christian Reuther, Freiberg (DE); Manfred Schingnitz, Freiberg (DE); Heidrun Toth, Freiberg (DE)

(73) Assignee: Siemens Aktiengesellschaft, München (DE)

( * ) Notice: Subject to any disclaimer, the term of this patent is extended or adjusted under 35 U.S.C. 154(b) by 791 days.

(21) Appl. No.: 12/283,412

(22) Filed: Sep. 11, 2008

(65) Prior Publication Data

US 2009/0077885 A1  Mar. 26, 2009

(30) Foreign Application Priority Data

Sep. 21, 2007  (DE) .......................... 10 2007 045 322

(51) Int. Cl.
*C10J 1/207* (2012.01)
*B01J 7/00* (2006.01)

(52) U.S. Cl.
USPC .................. 48/76; 48/61; 48/127.9; 48/127.1; 48/67; 48/77; 48/78; 48/75; 48/63; 48/69; 48/197 R; 48/198.3; 48/203; 422/242; 422/198; 422/203; 422/205; 422/204

(58) Field of Classification Search
USPC .......... 48/71, 76, 62 R, 63, 64, 77, 69, 127.9, 48/61; 122/5; 422/198, 203–205, 242
See application file for complete search history.

(56) References Cited

U.S. PATENT DOCUMENTS

| | | | |
|---|---|---|---|
| 4,002,672 A | 1/1977 | Smith | |
| 4,202,672 A | 5/1980 | Schuurman | |
| 4,818,253 A | 4/1989 | Koehnen et al. | |
| 4,848,253 A | 7/1989 | Tajima | |
| 5,333,574 A * | 8/1994 | Brady et al. | 122/367.1 |
| 5,667,758 A * | 9/1997 | Matsugi et al. | 422/198 |
| 7,037,473 B1 * | 5/2006 | Donner et al. | 422/242 |
| 2007/0079554 A1 * | 4/2007 | Schingnitz et al. | 48/210 |
| 2008/0222955 A1 * | 9/2008 | Jancker et al. | 48/67 |

FOREIGN PATENT DOCUMENTS

| | | |
|---|---|---|
| CN | 2688677 Y | 3/2005 |
| DE | 237318 A1 | 7/1986 |
| DE | 197 18 131 A1 | 11/1998 |
| DE | 202007011109 U1 | 1/2008 |
| EP | 0254830 A2 | 2/1988 |
| WO | 2008087133 A1 | 7/2008 |

OTHER PUBLICATIONS

Noell-Konversionsverfahren zur Verwertung und Entsorgung von Abfällen; EF-Verlag für Energie- und Umwelttechnik GmbH 1996, Berlin; pp. 32-33; J. Carl u. a.; ISBN: 3-924511-82-9.

* cited by examiner

*Primary Examiner* — Kaity V. Handal

(57) ABSTRACT

In a reactor for gasification of entrained solid and liquid fuels at temperatures between 1,200 and 1,900° C. and at pressures between ambient pressure and 10 MPa using an oxidizing agent containing free oxygen, the cooling screen is connected to the pressure shell in a gastight manner via a sliding seal in order to allow length changes. Continuous gas purging of the annular gap between pressure shell and cooling screen is unnecessary and gasification gas is prevented from flowing behind.

4 Claims, 1 Drawing Sheet

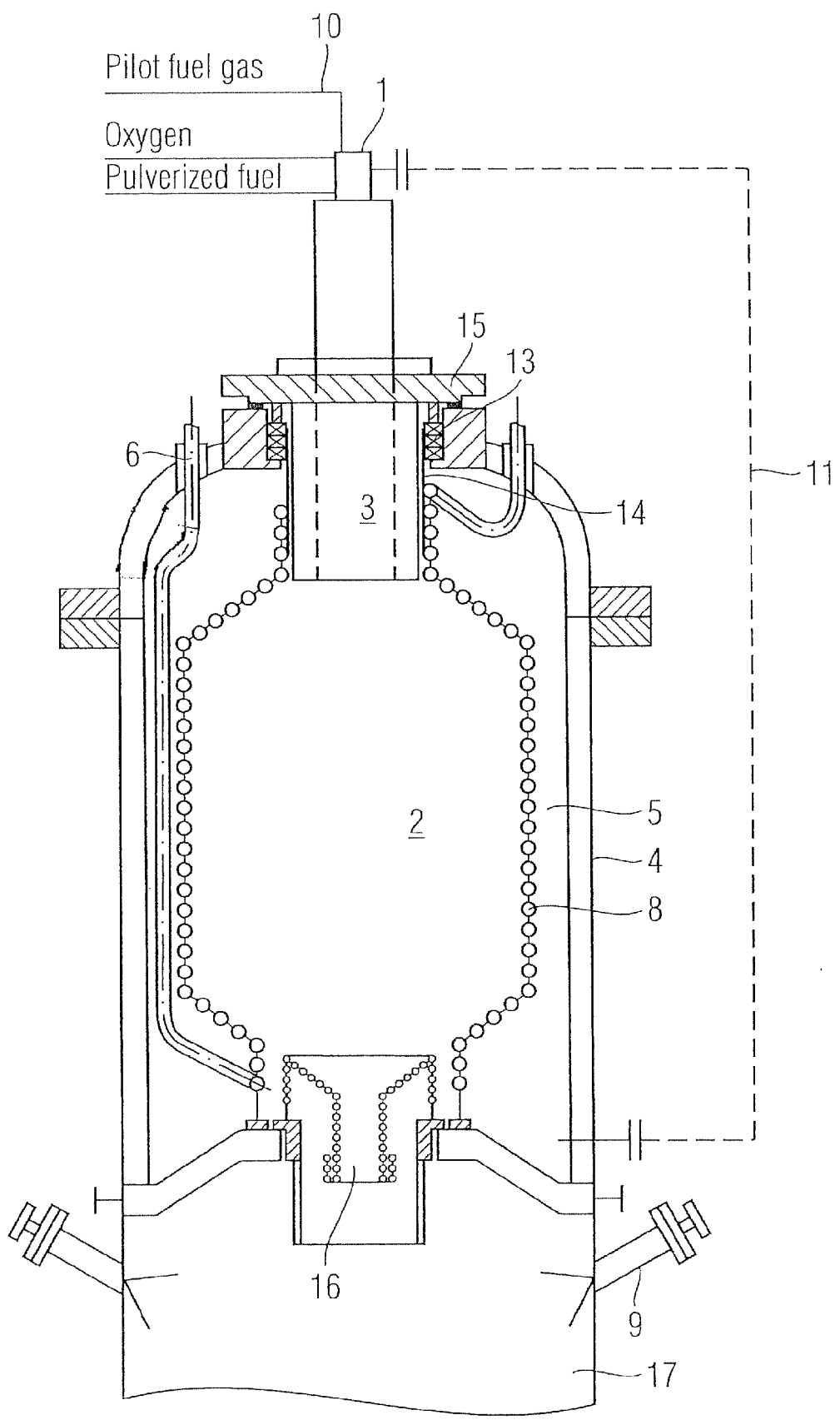

ENTRAINED-FLOW GASIFIER WITH COOLING SCREEN AND SLIDING SEAL

CROSS REFERENCE TO RELATED APPLICATIONS

This application claims the benefits of German application No. 10 2007 045 322.3 filed Sep. 21, 2007 and is incorporated by reference herein in its entirety.

FIELD OF INVENTION

The invention relates to a reactor for the gasification of entrained solid and liquid fuels, having the features of the claims.

BACKGROUND OF THE INVENTION

The invention relates to a reactor for entrained-flow gasification of different solid and liquid fuels using an oxidizing agent containing free oxygen under normal or raised pressure up to 8 MPa. In this case solid fuels comprise pulverized coals of various degrees of coalification, petroleum coke, and other grindable solids having a calorific value greater than 7 MJ/Nm$^3$. Liquid fuels comprise oils, oil-solid suspensions or water-solid suspensions such as coal water slurries, for example. In the field of gas generation from solid fuels, autothermic entrained-flow gasification has been known for many years. In this case the ratio of fuel to oxygen-containing gasification agent is selected such that temperatures higher than the melting point of the ash are reached. The ash is then fused into liquid clinker which, with the gasification gas or separately, leaves the gasification chamber and is then directly or indirectly cooled. Such an apparatus is disclosed in DE 197 18 131 A1.

A detailed description of such a gasification reactor equipped with a cooling screen is given in J. Carl et al, NOELL-KONVERSIONSVERFAHREN, EF-Verlag für Energie-und Umwelttechnik GmbH 1996, pages 32-33. The design described therein includes a cooling screen, consisting of cooling tubes that are welded in a gastight manner, within a pressure vessel. This cooling screen is supported on an intermediate floor, and can extend freely upward. This ensures that, when different temperatures and consequential length changes occur as a result of start and stop processes, no mechanical stresses can occur which could possibly result in destruction. In order to achieve this, there is not a permanent connection at the top end of the cooling screen, but a gap between the cooling screen collar and the flange of the burner, allowing freedom of movement. In order to prevent gasification gas from flowing behind the cooling screen gap when pressure fluctuations occur in the system, the cooling screen gap is purged using a dry gas that is free of condensate and oxygen. Despite the purging it is evident in practice that gasification gas does flow behind, resulting in corrosion on the rear side of the cooling screen or on the pressure shell. This can lead to operating failures and even destruction of the cooling screen or of the pressure shell.

SUMMARY OF INVENTION

The present invention addresses the problem of avoiding the cited disadvantages.

According to the invention these disadvantages are overcome by the solution cited in the claims.

The invention proposes a permanent connection of the cooling screen to the pressure shell or the upper reactor flange, wherein said connection renders continuous gas purging unnecessary and prevents gasification gas from flowing behind. The permanent connection between cooling screen and pressure shell is gastight and allows movements between cooling screen and pressure shell along the central axis of the reactor.

Technical measures for the pressure regime between the gasification chamber and the cooling screen gap are shown in a further embodiment.

BRIEF DESCRIPTION OF THE DRAWINGS

The invention is explained below as an exemplary embodiment, to an extent that is required for understanding, with reference to a FIGURE, in which:

FIG. 1 shows a seal according to the invention, comprising a sliding seal for equalizing the temperature-induced length change.

DETAILED DESCRIPTION OF INVENTION 50 t of coal dust and 35,000 Nm$^3$ of water vapor per hour are supplied to a gasification reactor as per FIG. 1 via a gasification burner 1, which simultaneously contains a pilot burner, and are converted into 75,000 Nm$^3$ of crude synthesis gas at 3 MPa (30 bar) in the gasification chamber 2. The gasification burner 1 is arranged in a burner fastening device 3. The gasification chamber 2 is delimited by a cooling screen 8 which is formed of cooling tubes that have been welded in a gastight manner. The gasification temperature measured at the outlet device 16 is 1,500° C. The hot gasification gas leaves the gasification chamber 2 via the outlet device 16, together with the liquid clinker resulting from the coal ash, and arrives in the cooling chamber 17 in which the crude gasification gas is cooled to approximately 200° C. by means of injecting cooling water via the jet nozzles 9 and is simultaneously saturated with water vapor. The cooled crude gas is then supplied to further gas preparation technologies. An annular gap which must be protected against underpressure and excessive overpressure is located between the pressure shell 4 of the gasification reactor and the cooling screen 8. At the same time it is appropriate to maintain a slight overpressure of 1 to 2 bar relative to the gasification chamber 2. This is achieved e.g. by providing a connection 11 from the gas of the pilot burner 10 to the annular chamber 5. Since the pressure loss of the pilot fuel gas 10 in the burner is 1 to 2 bar, the slight overpressure in the annular gap 5 is assured by the connection 11. Of course, this slight overpressure can also be ensured by other gas sources, e.g. from a nitrogen network. In order to ensure gastightness between the annular gap 5 and the gasification chamber 2, an impervious connection 12 to the pressure shell 4 is provided at the upper end of the cooling screen 8. In order to equalize length changes of the cooling screen which can occur in the context of varying temperatures in the gasification chamber 2, a sliding seal 13 is incorporated into the impervious connection 12 between the cooling screen 8 and the pressure shell 4. The gap which arises between the upper end of the cooling screen 8 and the burner fastening unit 3 is filled during the installation. The cooling water for the cooling screen 8 is fed in via the supply 6.

The cooling screen 8 is extended at its upper end by a smooth cylindrical tube construction 14 which interacts with the sliding seal. The sliding seal, which can be produced using asbestos rope, is embedded in a cylindrical recess in the reactor flange. A circular ridge, the internal diameter of which is only marginally greater than the external diameter of the tube construction, prevents the sliding seal 13 from escaping in the direction of the outlet device 16. Tightening the cover flange 15 causes the sliding seal to be compressed, thereby pressing it against the tube construction and thus producing gastightness.

The invention claimed is:

1. A reactor for gasification of entrained solid and liquid fuels at temperatures between 1,200 and 1,900° C. and at pressures between ambient pressure and 10 MPa where solid fuels comprise pulverized coal of various degrees of coalification, petroleum coke or other substances containing solid carbons and liquid fuels can comprise oils, oil-solid suspensions or water-solid suspensions, using an oxidizing agent which contains free oxygen, comprising:
 a burner;
 a gasification chamber;
 a cover flange;
 a pressure shell; and
 a cooling screen comprising cooling tubes connected to the pressure shell in a gastight manner via a sliding seal in order to allow length changes in the direction of the central axis of the reactor wherein the sliding seal surrounds the burner concentrically; and
 a fluid conduit that provides a fluid communication between pilot burner fuel gas upstream of the burner and an annular gap, effective to enable pressurization of the annular gap between the pressure shell and the cooling screen with pilot burner fuel gas,
 wherein the connection of the cooling screen to the pressure shell does not allow any gasification gas into the annular gap in order to prevent corrosion of the cooling screen and/or pressure shell, and
 wherein an overpressure relative to the gasification chamber is established and maintained in the annular gap between the pressure shell and the cooling screen by the fluid conduit such that the reactor operates with a steady state pressure difference.

2. The reactor as claimed in claim 1, wherein the annular gap between the pressure shell and the cooling screen is exposed to pressure via an external gas network.

3. The reactor as claimed in claim 2, wherein the sliding seal interacts with a tubular piece that extends the cooling screen.

4. The reactor as claimed in claim 3, wherein the sliding seal is compressed by tightening the cover flange.

* * * * *